United States Patent
Niwa (10) Patent No.: US 9,229,815 B2
(45) Date of Patent: Jan. 5, 2016

(54) INFORMATION PROCESSING APPARATUS, PROGRAM UPDATE METHOD, AND PROGRAM

(71) Applicant: CANON KABUSHIKI KAISHA, Tokyo (JP)

(72) Inventor: Koji Niwa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 219 days.

(21) Appl. No.: 13/921,318

(22) Filed: Jun. 19, 2013

(65) Prior Publication Data

US 2013/0346796 A1 Dec. 26, 2013

(30) Foreign Application Priority Data

Jun. 21, 2012 (JP) ................................ 2012-139765

(51) Int. Cl.
G06F 11/00 (2006.01)
G06F 11/14 (2006.01)

(52) U.S. Cl.
CPC ........ *G06F 11/1412* (2013.01); *G06F 11/1402* (2013.01); *G06F 11/1433* (2013.01)

(58) Field of Classification Search
CPC . G06F 11/1402; G06F 1/1412; G06F 1/1433; G06F 8/65; G06F 8/665
USPC ........................................... 714/15, 19, 38.1
See application file for complete search history.

(56) References Cited

U.S. PATENT DOCUMENTS

| 6,438,749 | B1 * | 8/2002 | Chamberlain | 717/174 |
|---|---|---|---|---|
| 6,665,813 | B1 * | 12/2003 | Forsman et al. | 714/15 |
| 2007/0055969 | A1 * | 3/2007 | Yang | 717/168 |
| 2007/0226334 | A1 * | 9/2007 | Aoyagi et al. | 709/224 |
| 2013/0125107 | A1 * | 5/2013 | Bandakka et al. | 717/171 |

FOREIGN PATENT DOCUMENTS

| JP | 2001-117780 A | 4/2001 |
|---|---|---|
| JP | 2004-042304 A | 2/2004 |

* cited by examiner

*Primary Examiner* — Joseph D Manoskey
(74) *Attorney, Agent, or Firm* — Carter, DeLuca, Farrell & Schmidt, LLP (57) ABSTRACT

There is provided an information processing apparatus which is equipped with: an identifying unit configured to identify an update-object program which is an object of an update; an acquiring unit configured to, in preparation for a failure of the update of the update-object program, acquire from an external device a restoration program for restoring a state of the update-object program to a state before the update; an update unit configured to update the update-object program after the acquiring unit acquired the restoration program from the external device; and a restoring unit configured to, in the case of the failure of the update of the update-object program by the update unit, restore the state of the update-object program to the state before the update, on the basis of the restoration program acquired by the acquiring unit.

6 Claims, 5 Drawing Sheets

FIG. 3

FIG. 4A — COMBINATION BEFORE UPDATE

BODY CONTROLLER

| PROGRAM NAME | VERSION |
|---|---|
| OS | 1.0 |
| UI | 1.0 |
| SCAN | 1.0 |
| PRINT | 1.0 |
| NW | 1.0 |
| UPDATE | 1.0 |

BIOS

| BIOS | 1.0 |
|---|---|

ENGINE CONTROLLER

| DCON | 1.0 |
|---|---|

SCANNER CONTROLLER

| RCON | 1.0 |
|---|---|

FIG. 4B — COMBINATION OF UPDATE OBJECTS

BODY CONTROLLER

| PROGRAM NAME | VERSION |
|---|---|
| OS | 2.0 |
| UI | 2.0 |
| SCAN | 1.0 |
| PRINT | 2.0 |
| NW | 1.0 |
| UPDATE | 1.0 |

BIOS

| BIOS | 2.0 |
|---|---|

ENGINE CONTROLLER

| DCON | 2.0 |
|---|---|

SCANNER CONTROLLER

| RCON | 1.0 |
|---|---|

FIG. 4C — UPDATE DATA TO BE ACQUIRED FOR UPDATE

ACQUISITION-OBJECT PROGRAMS

| PROGRAM NAME | VERSION |
|---|---|
| OS | 2.0 |
| UI | 2.0 |
| PRINT | 2.0 |
| BIOS | 2.0 |
| DCON | 2.0 |

FIG. 4D — UPDATE DATA TO BE ACQUIRED FOR ERROR RESTORATION

ACQUISITION-OBJECT PROGRAMS

| PROGRAM NAME | VERSION |
|---|---|
| OS | 1.0 |
| UI | 1.0 |
| PRINT | 1.0 |
| BIOS | 1.0 |
| DCON | 1.0 |

FIG. 4E — COMBINATION IN CASE OF FAILURE OF UPDATE OF BODY CONTROLLER

BODY CONTROLLER

| PROGRAM NAME | VERSION |
|---|---|
| OS | 1.0 |
| UI | 1.0 |
| SCAN | 1.0 |
| PRINT | 1.0 |
| NW | 1.0 |
| UPDATE | 1.0 |

BIOS

| BIOS | 2.0 |
|---|---|

ENGINE CONTROLLER

| DCON | 2.0 |
|---|---|

SCANNER CONTROLLER

| RCON | 1.0 |
|---|---|

FIG. 5

FIG. 6A — COMBINATION BEFORE UPDATE

BODY CONTROLLER

| PROGRAM NAME | VERSION |
|---|---|
| OS | 1.0 |
| UI | 1.0 |
| SCAN | 1.0 |
| PRINT | 1.0 |
| NW | 1.0 |
| UPDATE | 1.0 |

BIOS

| BIOS | 1.0 |
|---|---|

ENGINE CONTROLLER

| DCON | 1.0 |
|---|---|

SCANNER CONTROLLER

| RCON | 1.0 |
|---|---|

FIG. 6B — COMBINATION OF UPDATE OBJECTS

BODY CONTROLLER

| PROGRAM NAME | VERSION |
|---|---|
| OS | 2.0 |
| UI | 2.0 |
| SCAN | 1.0 |
| PRINT | 2.0 |
| NW | 1.0 |
| UPDATE | 1.0 |

BIOS

| BIOS | 2.0 |
|---|---|

ENGINE CONTROLLER

| DCON | 2.0 |
|---|---|

SCANNER CONTROLLER

| RCON | 1.0 |
|---|---|

FIG. 6C — UPDATE DATA TO BE ACQUIRED FOR UPDATE

ACQUISITION-OBJECT PROGRAMS

| PROGRAM NAME | VERSION |
|---|---|
| OS | 2.0 |
| UI | 2.0 |
| PRINT | 2.0 |

| BIOS | 2.0 |
|---|---|

| DCON | 2.0 |
|---|---|

FIG. 6D — UPDATE DATA TO BE ACQUIRED FOR ERROR RESTORATION

ACQUISITION-OBJECT PROGRAMS

| BIOS | 1.0 |
|---|---|

| DCON | 1.0 |
|---|---|

FIG. 6F — PROGRAMS TO BE PREVIOUSLY EVACUATED FOR ERROR RESTORATION

EVACUATION-OBJECT PROGRAMS

| PROGRAM NAME | VERSION |
|---|---|
| OS | 1.0 |
| UI | 1.0 |
| PRINT | 1.0 |

FIG. 6E — COMBINATION IN CASE OF FAILURE OF UPDATE OF EXTERNAL CONTROLLER

BODY CONTROLLER

| PROGRAM NAME | VERSION |
|---|---|
| OS | 2.0 |
| UI | 2.0 |
| SCAN | 1.0 |
| PRINT | 2.0 |
| NW | 1.0 |
| UPDATE | 1.0 |

BIOS

| BIOS | 2.0 |
|---|---|

ENGINE CONTROLLER

| DCON | 2.0 |
|---|---|

SCANNER CONTROLLER

| RCON | 1.0 |
|---|---|

INFORMATION PROCESSING APPARATUS, PROGRAM UPDATE METHOD, AND PROGRAM

BACKGROUND OF THE INVENTION

1. Field of the Invention

The present invention relates to an information processing apparatus, a program update method, and a program for achieving the program update method.

2. Description of the Related Art

Conventionally, a technique of updating a program to be executed by an information processing apparatus such as an image forming apparatus or the like has been known.

Further, a technique of, in preparation for a case where an error occurs in an update of a program and/or a case where an updated program itself has a problem, previously evacuating or saving a program not yet updated and, when an error actually occurs, performing restoration by the previously evacuated program has been known (e.g., Japanese Patent Application Laid-Open No. 2001-117780). Further, a technique of, when updating a plurality of programs to be executed by an information processing apparatus, managing and controlling a combination of versions of the plurality of programs, and giving a warning when the combination of the versions of the plurality of programs is not appropriate has been known (e.g., Japanese Patent Application Laid-Open No. 2004-042304). In the technique as disclosed in Japanese Patent Application Laid-Open No. 2004-042304, the update of each of the plurality of programs is independently performed, and, after completion of the update of each program, it is judged whether or not the combination of the versions of these programs is appropriate.

In the technique as disclosed in Japanese Patent Application Laid-Open No. 2001-117780, when the error actually occurs in the program, the relevant program is restored to the program which has been previously evacuated and is not yet updated. Here, for example, the programs to be used for operation control of the image forming apparatus include not only a body controller, but also a plurality of external controllers such as a BIOS (Basic Input/Output System), an engine controller, a scanner controller and the like. Moreover, the plurality of external controllers (external controller programs) include a program of which communication speed is low and thus to which it takes a long time to evacuate before an update, a program which cannot be evacuated before an update, or the like. Consequently, in this technique, there is a problem that impossibility of the program restoration in case of the occurrence of the error has not been considered.

Besides, in the technique as disclosed in Japanese Patent Application Laid-Open No. 2004-042304, when the update of each program is normally completed, it is then judged whether or not the combination of the versions of the programs is appropriate. Namely, in the technique as disclosed in Japanese Patent Application Laid-Open No. 2004-042304, there is a problem that impossibility of the normal update of each program due to the occurrence of the error in the update has not been considered.

The present invention has been completed in consideration of the above problems, and an object thereof is to, even when an error occurs during updates of the plurality of programs, return the combination of the versions of the plurality of programs to the combination of the versions of the programs before the updates.

SUMMARY OF THE INVENTION

To achieve the above object, the present invention is characterized by providing an information processing apparatus which can communicate with an external device, comprising: an identifying unit configured to identify an update-object program which is an object of an update; an acquiring unit configured to, in preparation for a failure of the update of the update-object program, acquire from the external device a restoration program for restoring a state of the update-object program to a state before the update; an update unit configured to update the update-object program after the acquiring unit acquired the restoration program from the external device; and a restoring unit configured to, in the case of the failure of the update of the update-object program by the update unit, restore the state of the update-object program to the state before the update, on the basis of the restoration program acquired by the acquiring unit.

Further features of the present invention will become apparent from the following description of exemplary embodiments with reference to the attached drawings.

DESCRIPTION OF THE EMBODIMENTS

Hereinafter, preferred embodiments of the present invention will now be described in detail with reference to the attached drawings.

Figure 1:
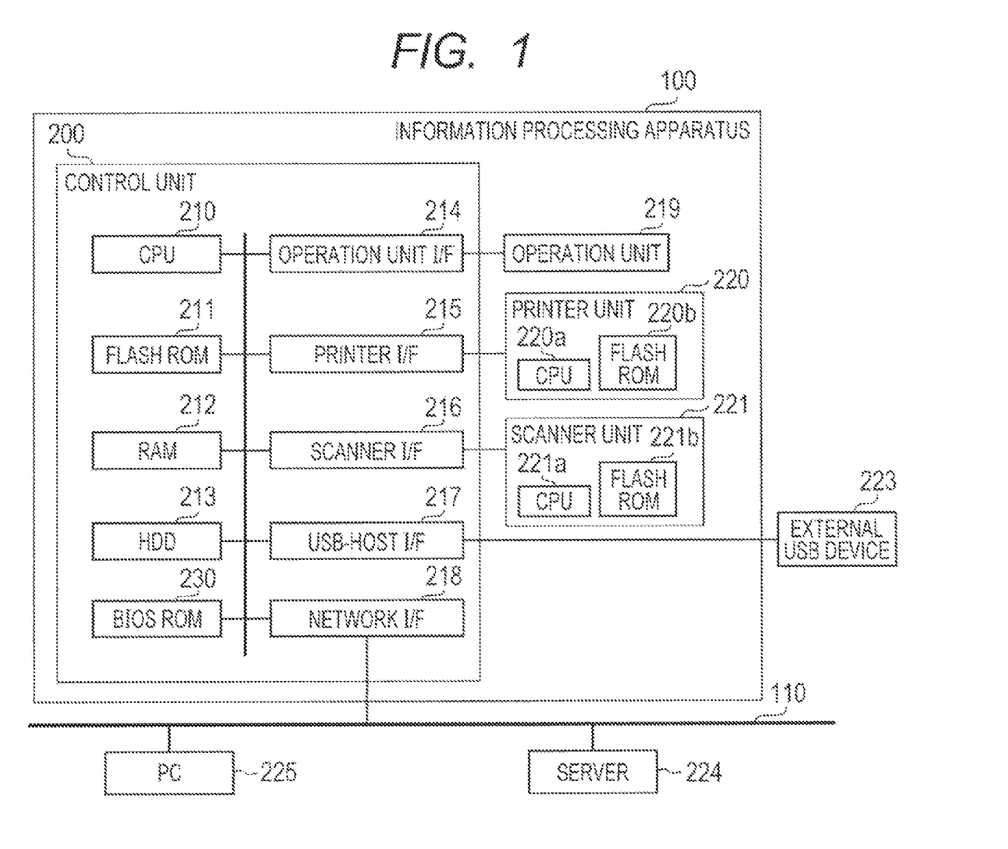
FIG. 1 is a block diagram illustrating an example of a hardware constitution of an information processing apparatus.

FIG. 1 is a block diagram illustrating an example of a hardware constitution of an information processing apparatus 100. Incidentally, it should be noted that, in the following description, an image forming apparatus is used as an example of the information processing apparatus.

A control unit 200 controls the whole of the information processing apparatus 100. Moreover, the control unit 200 includes the following components as the constitution for controlling the information processing apparatus 100.

A CPU (central processing unit) 210 reads out a program for the control unit 200 stored in a flash ROM (read only memory) 211 to a RAM (random-access memory) 212, and executes the read program.

Print data received from a PC (personal computer) 225 through a network I/F (interface) 218 is stored in an HDD (hard disk drive) 213. Incidentally, the program to be executed by the CPU 210 includes a later-described print application program. The print data stored in the HDD 213 is converted into image data capable of being printed by a printer unit 220, by the process of the CPU 210 based on the print application program. Also, the image data capable of being printed by the printer unit 220 is stored in the HDD 213.

Further, the program to be executed by the CPU 210 includes a later-described scan application program. Thus, image data is read by a scanner unit 221 and the read image data is transferred to the HDD 213, by the process of the CPU 210 based on the scan application program. Also, the read image data is stored in the HDD 213.

An operation unit I/F 214 is the interface for transferring an instruction input by an operator of the information processing apparatus 100 through an operation unit 219 to the CPU 210. Further, the operation unit I/F 214 receives, from the CPU 210, an instruction for switching over the content to be displayed on the operation unit 219, and transfers the received instruction to the operation unit 219.

A printer I/F 215 is the interface for connecting the control unit 200 and the printer unit 220 to each other. Here, the printer unit 220 performs a print process on a paper sheet on the basis of the image data transferred from the HDD 213 through the printer I/F 215. Incidentally, the printer unit 220 includes a CPU 220a and a flash ROM 220b. The CPU 220a causes the printer unit 220 to perform various operations associated with the print process, by executing the program stored in the flash ROM 220b.

A scanner I/F 216 is the interface for connecting the control unit 200 and the scanner unit 221 to each other. Here, the scanner unit 221 reads out an image on an original document as image data by using a line sensor constituted by a CCD (charge coupled device) and the like. Then, the scanner unit 221 transfers the read image data to the HDD 213 through the scanner I/F 216. The image data transferred to and stored in the HDD 213 can be then printed by the printer unit 220. Thus, a copy process can be performed by the printer unit 220 which prints the image data read by the scanner unit 221. Incidentally, the scanner unit 221 includes a CPU 221a and a flash ROM 221b. The CPU 221a causes the scanner unit 221 to perform various operations associated with the scan process, by executing the program stored in the flash ROM 221b.

A USB-host I/F (Universal Serial Bus host interface) 217 is the interface for connecting the control unit 200 and an external USB device 223 to each other. Here, it should be noted that a USB memory, a USB keyboard or the like is exemplarily used as the external USB device 223. Incidentally, it may be possible to store a program in the USB memory, download the stored program, and set the downloaded program in a file storage area of the flash ROM 211.

The network I/F 218 connects the control unit 200 to a LAN (local area network) 110, and further performs communication with the PC 225 and a server 224 respectively provided on the LAN 110. Incidentally, the server 224 stores therein update information for updating later-described various programs (to be executed by the information processing apparatus 100), and thus transmits the update information to the information processing apparatus 100 in response to a request from the information processing apparatus 100.

The program of the BIOS is stored in a BIOS ROM 230. Here, the BIOS is the program for controlling a start and operations of the information processing apparatus 100.

Figure 2:
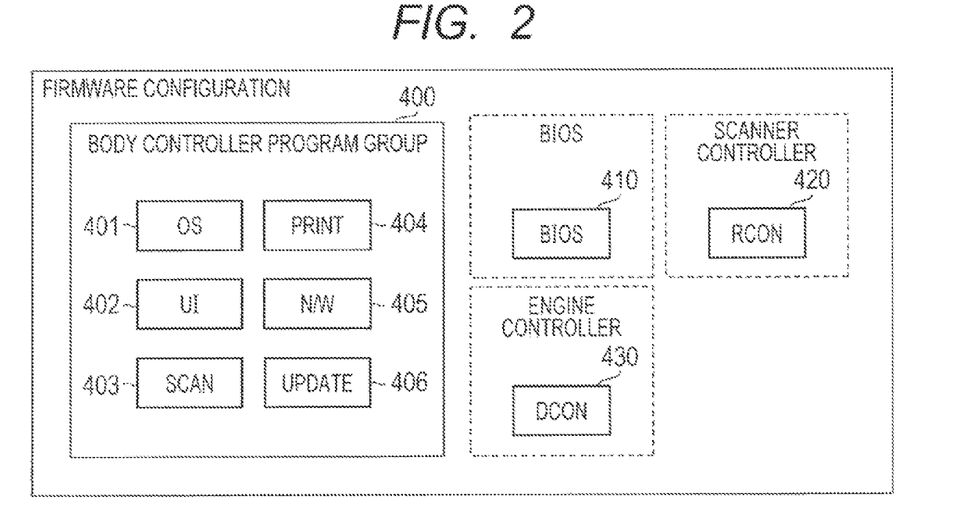
FIG. 2 is a block diagram illustrating an example of a configuration of programs and the like of the information processing apparatus.

Subsequently, a configuration of programs to be executed by the CPU 210 of the control unit 200 will be described with reference to FIG. 2. Namely, FIG. 2 is the block diagram illustrating an example of the configuration of the programs and the like of the information processing apparatus 100.

The information processing apparatus 100 has the body controller (i.e., body controller program group) 400 normally used by a user, a BIOS 410, a DCON 430 serving as the engine controller (i.e., engine controller program) of the printer unit 220, and an RCON 420 serving as the scanner controller (i.e., scanner controller program) of the scanner unit 221.

The body controller 400 is stored in the flash ROM 211, the BIOS 410 is stored in the BIOS ROM 230, the DCON 430 is stored in the flash ROM 220b of the printer unit 220, and the RCON 420 is stored in the flash ROM 221b of the scanner unit 221.

Subsequently, each program included in the body controller 400 will be described.

An OS (operating system) 401 is the OS for controlling the information processing apparatus 100, and this OS includes the driver program for controlling an operation of each part of the information processing apparatus 100 including the printer unit 220 and the scanner unit 221. A UI (user interface) 402 is the program for transferring the instruction input by the operator of the information processing apparatus 100 through the operation unit 219 to the CPU 210, and performing the process according to the transferred instruction. A SCAN 403 is the program for controlling the above scan process by the scanner unit 221. A PRINT 404 is the program for controlling the above print process by the printer unit 220. An N/W 405 is the program for communicating with the PC 225 and the server 224 respectively provided on the LAN 110. An UPDATE 406 is the program for performing updates of the plurality of firmwares as illustrated in FIG. 2.

It should be noted that these programs are merely examples of the programs for the information processing apparatus 100. That is, each of these programs may internally include further detailed subprogram groups, and programs other than the above programs may be presented.

First Embodiment

Subsequently, a program update process to be performed in the first embodiment will be described with reference to FIG. 3 and FIGS. 4A to 4E.

Figure 3:
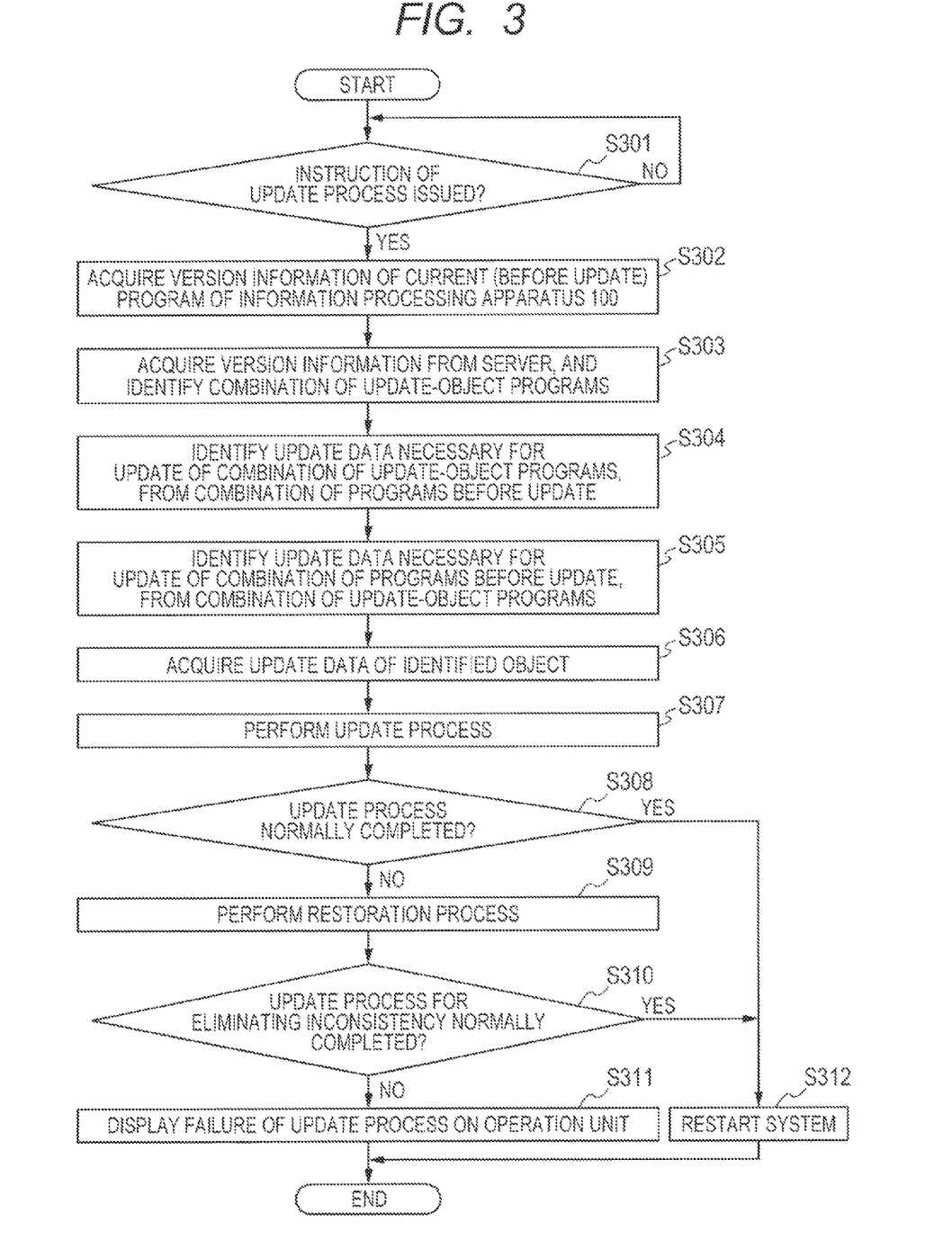
FIG. 3 is a flow chart indicating an example of a program update process according to the first embodiment.

FIG. 3 is the flow chart indicating an example of the program update process in the first embodiment. FIGS. 4A to 4E are the diagrams illustrating lists of update-object programs and update data necessary for updates in the first embodiment. Here, it should be noted that the update-object program implies the program which is the object (subject) to be updated.

Incidentally, the process in each step of FIG. 3 is achieved on the condition that the CPU 210 of the control unit 200 executes the program stored in the flash ROM 211.

In a step S301, the CPU 210 judges whether or not an instruction to perform the update process for updating the program of the information processing apparatus 100 is issued. When it is judged that the instruction to perform the update process is issued, the process is advanced to a step S302. For example, the instruction to perform the update process is issued by the operator of the information processing apparatus 100 through the operation unit 219. Incidentally, it is possible, by previously set a schedule to periodically update the program every certain periods (e.g., every two weeks), to periodically and automatically issue the instruction to perform the update process.

In the step S302, the CPU 210 executes the UPDATE 406 through the OS 401. Thus, the CPU 210 acquires the versions of the respective programs stored in the flash ROM 211, the BIOS ROM 230, the flash ROM 220b and the flash ROM 221b. For example, the versions of the respective programs before update are shown in the list illustrated in FIG. 4A.

Figure 4A:
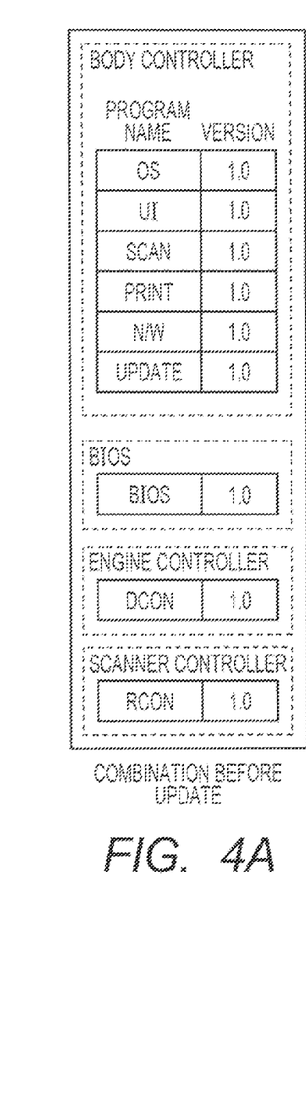
FIGS. 4A, 4B, 4C, 4D and 4E are diagrams illustrating lists of update-object programs and update data necessary for updates according to the first embodiment.
Figure 4B:
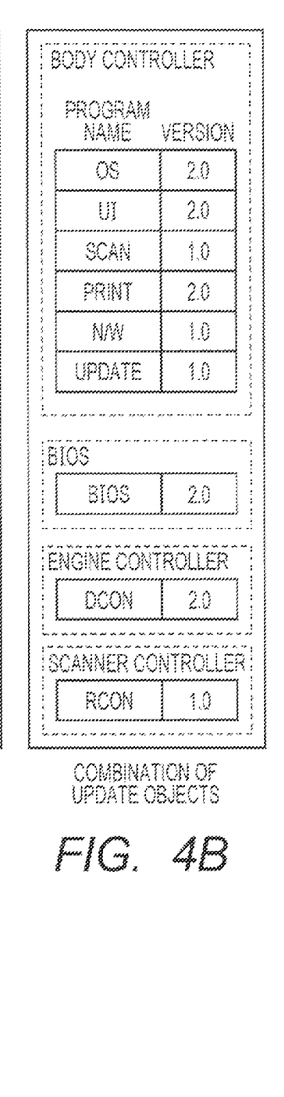

In a step S303, the CPU 210 transmits an acquisition request of the version including device type ID (identification) information for identifying the information processing apparatus 100 to the server 224 with which the information processing apparatus is communicable through the network, by executing the UPDATE 406 through the OS 401. Then, the information processing apparatus 100 acquires the versions of the plurality of programs of the information processing apparatus which are managed by the server 224 based on the device type ID information, and identifies a combination of the update-object programs (first identification). Here, the CPU 210 may cause the operation unit 219 to display the display screen for identifying the combination, and then identify as an update candidate the program indicated by the operator through the display screen of the operation unit 219. Besides, the CPU 210 may identify as the update object the latest combination based on the acquired versions, i.e., not based on the instruction of the operator. For example, the combination of the programs which are the update objects are shown in FIG. 4B. Incidentally, the CPU 210 may acquire the version not only from the server 224 but also from the external USB device 223 (e.g., a USB memory), the PC 225 or the like.

Figure 4C:
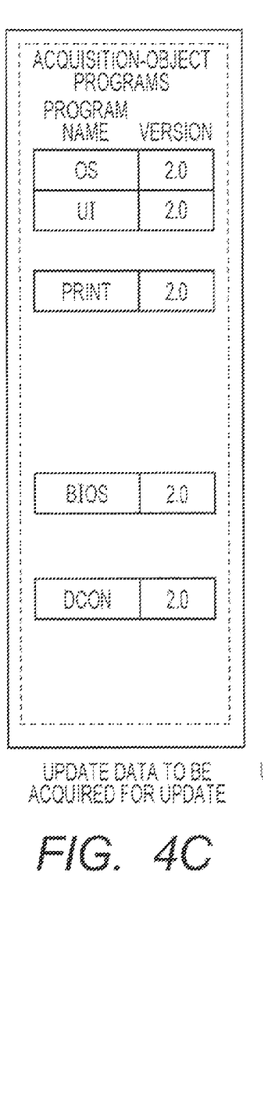

In a step S304, the CPU 210 identifies the program which is the update candidate by executing the UPDATE 406 through the OS 401. That is, the CPU 210 identifies the update data which is necessary to update the combination of the current programs (FIG. 4A) acquired in the step S302 to the combination of the respective programs being the update objects acquired in the step S303 (FIG. 4B). Here, since the OS, the UI, a PRINT program and the BIOS respectively included in the body controller 400, and the DCON (version 2.0) are necessary to update the combination illustrated in FIG. 4A to the combination illustrated in FIG. 4B, the list of the update data is as illustrated in FIG. 4C. That is, the CPU 210 identifies the program names of the plurality of programs being the update objects and the versions of the respective program after update, as illustrated in FIG. 4C.

Figure 4D:
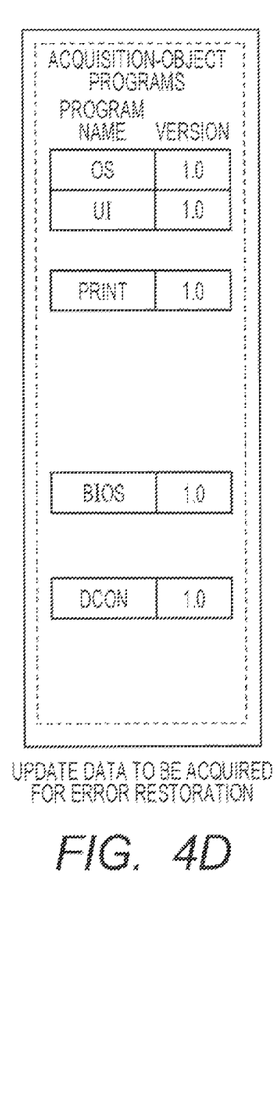

In a step S305, the CPU 210 identifies the program for returning the combination of the programs to the combination of the programs before update when an error occurs, by executing the UPDATE 406 through the OS 401. That is, the CPU 210 identifies the update data which is necessary to update the combination of the programs (FIG. 4B) which are the update objects acquired in the step S303 to the combination of the current (before update) programs (FIG. 4A) acquired in the step S302. Here, since the OS, the UI, the PRINT program and the BIOS respectively included in the body controller 400, and the DCON (version 1.0) are necessary to update the combination illustrated in FIG. 4B to the combination illustrated in FIG. 4A, the list of the update data is as illustrated in FIG. 4D. That is, the CPU 210 identifies the program names of the plurality of programs being the update objects and the versions of the respective program before update, as illustrated in FIG. 4D.

In a step S306, the CPU 210 acquires, from the server 224, the list of the update data which have been identified in the steps S304 and S305 (illustrated in FIGS. 4C and 4D), by executing the UPDATE 406 through the OS 401. Then, the CPU 210 stores the acquired update data in the information processing apparatus 100 (e.g., the HDD 213). Here, the update data illustrated in FIG. 4C is equivalent to the update program to be used to update the program which is the update object. Moreover, the update data illustrated in FIG. 4D is equivalent to a restoration program to be used to restore the program to the state before update when the update of the update-object program (i.e., the program being the update object) was failed. When the CPU 210 updates the combination of the programs to the combination of the update-object programs (FIG. 4B), the CPU uses the update data illustrated in FIG. 4C. Then, when the error occurs while the update is being performed, the CPU 210 returns the combination of the programs to the combination of the programs before update (FIG. 4A) by using the update data illustrated in FIG. 4D. Thus, it is possible to prevent that the combination of the versions of the respective programs becomes inappropriate. Incidentally, the CPU 210 may acquire the update data not only from the server 224 but also from the external USB device 223 (e.g., a USB memory), the PC 225 or the like.

In a step S307, the CPU 210 updates the combination of the programs to the combination of the programs (FIG. 4B) acquired in the step S303 with use of the update data acquired in the step S306, by executing the UPDATE 406 through the OS 401. More specifically, the CPU 210 updates the body controller 400 and the BIOS 410, and further updates the RCON 420 and the DCON 430 which are the external controllers. Since the respective programs have been stored in the different storage areas (namely, in the flash ROM 211, the BIOS ROM 230, the flash ROM 220b and the flash ROM 221b in this case), it is possible to shorten the update time by performing the update processes in parallel as much as possible.

In a step S308, the CPU 210 judges whether or not the update process in the step S307 has been normally completed, by executing the UPDATE 406 through the OS 401. When it is judged that the update process has been normally completed, the process is advanced to a step S312 by the CPU 210. On the other hand, when it is judged that the update process is not normally completed, the process is advanced to a step S309. Incidentally, as the case where the update process is not normally completed, for example, there is a case where the version of each program stored in each storage area is not coincident with the version of each program (FIG. 4B) acquired in the step S303 even if a predetermined time elapses. Here, for example, each storage area is equivalent to each of the flash ROM 211, the BIOS ROM 230, the flash ROM 220b and the flash ROM 221b.

Figure 4E:
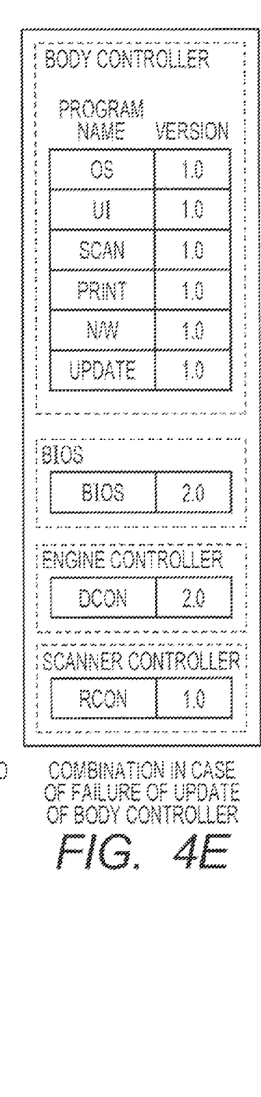

As a case where the update process fails, for example, there is a case where the update of the body controller 400 fails (the writing to the flash ROM 211 fails) but the updates of the BIOS 410 and the DCON 430 succeed. In this case, the combination of the programs as illustrated in FIG. 4E is given. Incidentally, as the reason why the update of the body controller 400 fails, for example, there is a case where a power failure occurs in the update process. When the combination of the programs as illustrated in FIG. 4E is given, since an inconsistency occurs in the combination of the versions of the OS 401 and the BIOS 410 and an inconsistency occurs in the combination of the versions of the PRINT 404 and the DCON 430, there is a possibility that the information processing apparatus cannot be normally started. For this reason, the CPU 210 performs a restoration process in the step S309 to return the combination of the programs to the combination of the respective programs before update (FIG. 4A), thereby eliminating the inconsistencies occurred in the combinations of the versions.

In the step S309, the CPU 210 executes the UPDATE 406 through the OS 401. Thus, the CPU 210 updates (or restores) the combination of the respective programs to the combination of the respective programs before update (FIG. 4A) acquired in the step S302, by using the restoration program acquired in the step S306. More specifically, the CPU 210 restores the body controller 400 and the BIOS 410, and further restores the RCON 420 and the DCON 430. Since the respective programs have been stored in the different storage areas (namely, in the flash ROM 211, the BIOS ROM 230, the flash ROM 220b and the flash ROM 221b in this case), it is possible to shorten the update time by performing the update processes in parallel.

In a step S310, the CPU 210 judges whether or not the update process in the step S309 has been normally completed, by executing the UPDATE 406 through the OS 401. More specifically, the CPU 210 judges whether or not the version of each program stored in each storage area is coincident with the version of each program (FIG. 4A) acquired in the step S302. When it is judged that the version of each program stored in each storage area is coincident with the version of each acquired program, the CPU 210 considers that the inconsistency has been eliminated, and the process is advanced to the step S312. On the other hand, when it is judged that the version of each program stored in each storage area is not coincident with the version of each acquired program, the CPU 210 considers that the update process has failed, and the process is advanced to a step S311. Here, for example, each storage area is equivalent to each of the flash ROM 211, the BIOS ROM 230, the flash ROM 220b and the flash ROM 221b. Incidentally, when it is considered that the inconsistency has been eliminated, the CPU 210 displays, on the operation unit 219 or the like, the screen or the like for indicating that the inconsistency has been eliminated. In this case, the process may be advanced to the step S312 after an instruction to restart the system is received from the operator through the screen.

In the step S311, the CU 210 displays, on the operation unit 219, a message indicating that the update process has failed, by executing the UPDATE 406 through the OS 401.

In the step S312, the CPU 210 restarts the system as a whole through the OS 401, and the update process is completed.

As described above, according to the first embodiment, in the case where the plurality of programs to be executed by the information processing apparatus are updated, even if the update process of any one of the programs is not completed, it is possible to prevent that the combination of the versions of the respective program becomes inappropriate. More specifically, the CPU 210 has previously acquired, from the server or the like, the update data (FIG. 4D) which is necessary to return the combination of the programs to the combination of the respective programs before update (FIG. 4A), together with the update data (FIG. 4C) which is necessary to update the combination of the programs to the combination of the update-object programs (FIG. 4B). Then, when the update process of any one of the programs fails, the CPU 210 returns the combination of the programs to the combination of the respective programs before update (FIG. 4A), by using the previously acquired update data. Thus, it is possible to make the combination of the versions of the respective programs appropriate.

Second Embodiment

Subsequently, the second embodiment of the present invention will be described hereinafter. In the first embodiment, the information processing apparatus 100 previously acquires, from the server or the like, the restoration program for the update-object program before the program is actually updated. However, there is a case where the programs such as the OS 401, the UI 402, the PRINT 404 and the like can be evacuated to the storage area (i.e., the HDD 213 or the like). That is, there is a case where the information processing apparatus 100 can create the restoration program. It should be noted that the second embodiment has been completed in this regard.

That is, in the second embodiment, the CPU 210 evacuates the program before update in the body controller 400. Further, the CPU 210 previously acquires, from an external device (e.g., the server 224), the update data which is necessary to return the combination of the programs to the combination of the programs before update in the external controllers such as the BIOS 410, the RCON 420, the DCON 430 and the like. Hereinafter, differences from the first embodiment will be mainly described with reference to FIG. 5 and FIGS. 6A to 6F. Here, it is assumed that the version of each program before update is as illustrated in the list of FIG. 6A, and the combination of the update-objects is as illustrated in FIG. 6B.

Figure 5:
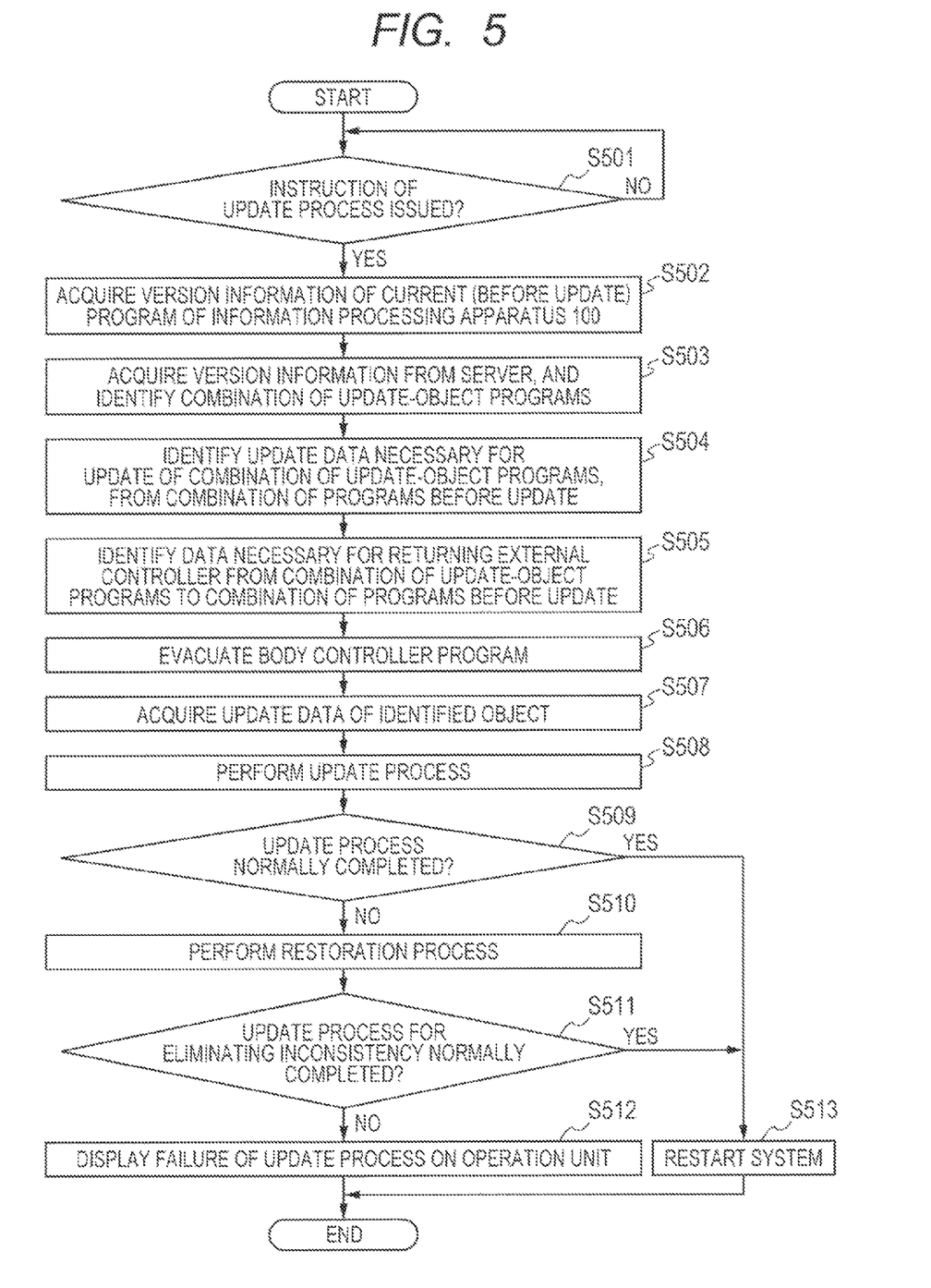
FIG. 5 is a flow chart indicating an example of a program update process according to the second embodiment.
Figure 6A:
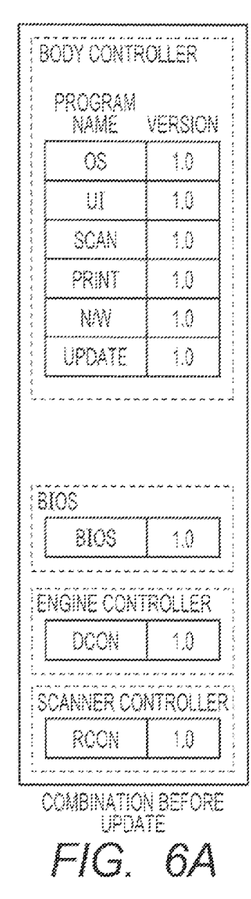
FIGS. 6A, 6B, 6C, 6D, 6E and 6F are diagrams illustrating lists of update-object programs and update data necessary for updates according to the second embodiment.
Figure 6B:
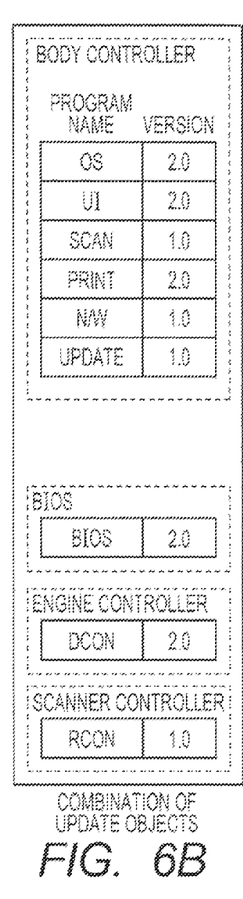

FIG. 5 is the flow chart indicating an example of a program update process according to the second embodiment. FIGS. 6A to 6F are the diagrams illustrating the lists of the update-object programs, the update data necessary for updates and the programs to be evacuated before the update, according to the second embodiment.

Incidentally, the process in each step of FIG. 5 is achieved on the condition that the CPU 210 of the control unit 200 executes the program stored in the flash ROM 211.

In a step S505, the CPU 210 identifies the program for returning the combination of the programs to the combination of the programs before update when an error occurs, by executing the UPDATE 406 through the OS 401. That is, the CPU identifies the update data which is necessary to update the combination of the programs (FIG. 6B) which are the update objects acquired in a step S503 to the combination of the current (before update) programs (FIG. 6A) acquired in a step S502. Here, since the BIOS and the DCON (version 1.0) are necessary to update the combination illustrated in FIG. 6B to the combination illustrated in FIG. 6A, the list of the update data is as illustrated in FIG. 6D. That is, the second embodiment is different from the first embodiment in the point that the program of the body controller 400 is not included in the list of the update data.

Incidentally, the programs included in the list illustrated in FIG. 6D are an example of a first restoration program.

In a step S506, the CPU 210 evacuates, as the restoration program, the program before update to return the program combination of the body controller 400 to the program combination before update when an error occurs, by executing the UPDATE 406 through the OS 401. That is, the CPU 210 identifies the program which is necessary to restore the combination of the current (before update) programs (FIG. 6A) acquired in the step S502 from the combination of the update-object programs (FIG. 6B) acquired in the step S503 (second restoration). Then, the CPU 210 evacuates the identified program into the control unit 200 (the HDD 213 or the like). It is necessary to evacuate the OS, the UI and the PRINT (version 1.0) in order to restore the program combination illustrated in FIG. 6A from the program combination illustrated in FIG. 6B in the body controller 400, and the programs which are the evacuation objects are as illustrated in FIG. 6F. Incidentally, the CPU 210 may evacuate all the programs included in the body controller 400 in accordance with a vacant memory in the control unit 200, or may evacuate only the necessary programs as described above.

In any case, it should be noted that the restoration program to be evacuated into the control unit 200 (the HDD 213 or the like) in the step S506 is the program of the body controller 400. Since the programs of the BIOS 410, the RCON 420 and the DCON 430 cannot be evacuated into the control unit 200 (the HDD 213 or the like), the restoration programs thereof are acquired from the server 224 in a step S507.

Here, the reason why the programs of the BIOS 410, the RCON 420 and the DCON 430 cannot be evacuated into the control unit 200 (the HDD 213 or the like) is the specifications of various interfaces such as the printer I/F 215, the scanner I/F 216 and the like. Even if the programs of the RCON 420 and the DCON 430 can be evacuated into the control unit 200 (the HDD 213 or the like), when communication speed of the printer I/F 215 and/or the scanner I/F 216 is low, it takes time to create the restoration programs. Therefore, as in the second embodiment, it is desirable to acquire the restoration program from the server 224.

Incidentally, the programs illustrated in FIG. 6F are an example of a second restoration program.

Figure 6C:
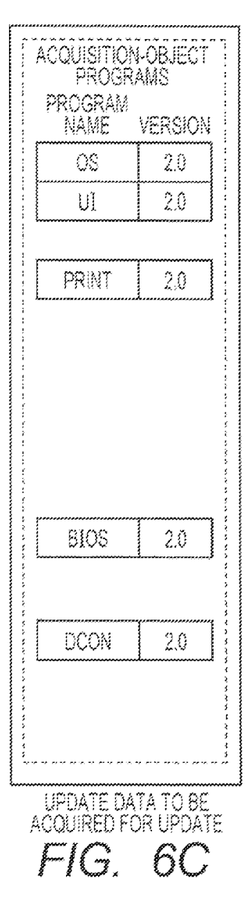
Figure 6D:
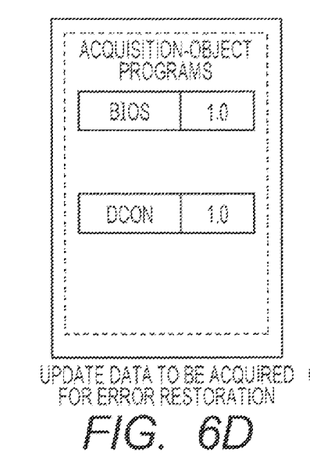

Further, the programs of the OS, the UI and the PRINT illustrated in FIG. 6C are an example of a first program, and the programs of the BIOS and the DCON illustrated in FIG. 6C are an example of a second program.

In a step S509, the CPU 210 judges whether or not the update process in a step S508 has been normally completed, by executing the UPDATE 406 through the OS 401. More specifically, the CPU 210 judges whether or not the version of each program stored in each storage area is coincident with the version of each program (FIG. 6B) acquired in the step S503. When it is judged that the version of each program stored in each storage area is coincident with the version of each acquired program, the CPU 210 considers that the update process has been normally completed, and the process is advanced to a step S513. On the other hand, when it is judged that the version of each program stored in each storage area is not coincident with the version of each acquired program, the CPU 210 considers that the update process has failed, and the process is advanced to a step S510. Here, for example, each storage area is equivalent to each of the flash ROM 211, the BIOS ROM 230, the flash ROM 220b and the flash ROM 221b.

Figure 6E:
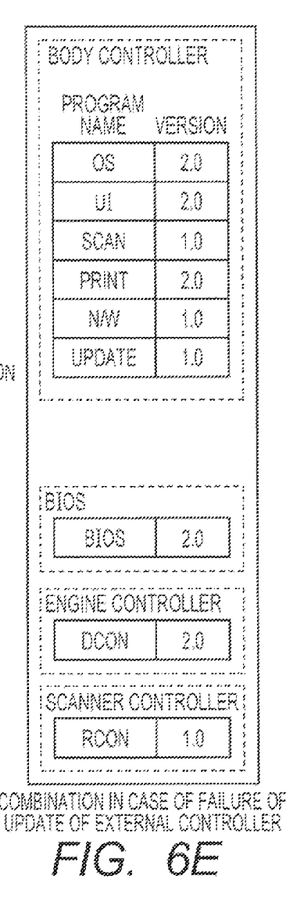
Figure 6F:
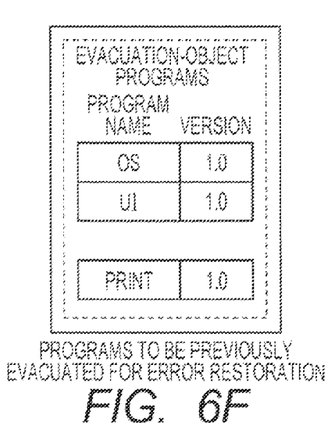

As a case where the update process fails, for example, there is a case where the updates of the body controller 400 and the BIOS 410 succeed but the update of the DCON 430 fails (the writing to the flash ROM 220b fails), and the combination of the programs as illustrated in FIG. 6E is given. In this case, since an inconsistency occurs in the combination of the versions of the PRINT 404 and the DCON 430, there is a possibility that the information processing apparatus cannot be normally started. For this reason, the CPU 210 performs the restoration process in the step S510 to return the combination of the programs to the combination of the respective programs before update (FIG. 6A), thereby eliminating the inconsistencies occurred in the combinations of the versions.

In the step S510, the CPU 210 executes the UPDATE 406 through the OS 401. Thus, the CPU 210 restores the combination of the respective programs to the combination of the respective programs before update (FIG. 6A) acquired in the step S502, by using the respective programs before update previously evacuated into the control unit 200 (the HDD 213 or the like) in the step S506 and the update data acquired in the step S507. More specifically, the CPU 210 restores the combination of the programs in the body controller 400 to the combination of the programs before update, by using the respective programs before update previously evacuated into the control unit 200 (the HDD 213 or the like) in the step S506. Further, the CPU 210 restores the states of the BIOS 410, the RCON 420 and the DCON 430 to the states before update, by using the update data acquired in the step S507. Since the respective programs have been stored in the different storage areas (namely, in the flash ROM 211, the BIOS ROM 230, the flash ROM 220b and the flash ROM 221b in this case), the CPU 210 can shorten the update time by performing the update (or restoration) processes in parallel.

As described above, according to the second embodiment, with respect to, among the update-object programs, the programs of the body controller 400, the restoration programs are created by the information processing apparatus 100 itself (step S506). On the other hand, with respect to the programs of the BIOS 410, the RCON 420 and the DCON 430, the restoration programs are not created by the information processing apparatus but are acquired from the server 224 (step S507). Consequently, with respect to the program for which the information processing apparatus 100 itself cannot create the restoration program, it is possible to previously prepare the restoration program before actually performing the update of the relevant program.

Other Embodiments

The present invention can also be realized by a process in which software (programs) for achieving the functions of the above embodiments is supplied to a system or an apparatus through a network or various storage media and a computer (a CPU, an MPU or the like) of the system or the apparatus reads out and executes the supplied programs.

According to the above embodiments, even if the error occurs while the plurality of programs are being updated, it is possible to easily return the combination of the versions of the programs to the combination of the versions of the programs before update.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

According to the present invention, even if the error occurs while the plurality of programs are being updated, it is possible to return the combination of the versions of the programs to the combination of the versions of the programs before update.

The embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2012-139765, filed Jun. 21, 2012, which is hereby incorporated by reference herein in its entirety.

What is claimed is:

1. An information processing apparatus which can communicate with a server, the information processing apparatus including a computer comprising:
a first memory configured to store a first program; and
a second memory configured to store a second program,
wherein the computer, when operated, performs as:
an acquiring unit configured to acquire, from the server, update data for updating the first program and the second program and first restoration data for restoring the first program to a previous state when the update has failed;

a generating unit configured to generate second restoration data for restoring the second program to a previous state when the update has failed;

an update unit configured to update the first program and the second program based on the acquired update data; and a restoring unit configured to, when the update performed by the updated unit has failed, restore the first program and the second program respectively to the previous states based on the acquired first restoration data and the generated second restoration data.

2. The information processing apparatus according to claim 1, wherein the generating unit generates the second restoration data by evacuating the second program to a predetermined storage area, and wherein the first program is a program which cannot be evacuated to the predetermined storage area.

3. The information processing apparatus according to claim 1, further comprising:

a controller configured to control the information processing apparatus; and a printer configured to perform printing, wherein the controller is equipped with the second memory, and wherein the printer is equipped with the first memory.

4. The information processing apparatus according to claim 1, further comprising:

a controller configured to control the information processing apparatus; and a scanner configured to perform original reading, wherein the controller is equipped with the second memory, and wherein the scanner is equipped with the first memory.

5. A program update method for updating a program of an information processing apparatus, comprising:

storing a first program;

storing a second program;

acquiring, from a server, update data for updating the first program and the second program, and first restoration data for restoring the first program to a previous state when the update has failed;

generating second restoration data for restoring the second program to a previous state when the update has failed;

updating the first program and the second program based on the acquired update data; and when the update has failed, restoring the first program and the second program, respectively, to their previous states based on the acquired first restoration data and the generated second restoration data.

6. A non-transitory computer-readable storage medium storing a program to cause a computer to perform the program update method according to claim 5.

* * * * *